Patented Jan. 13, 1925.

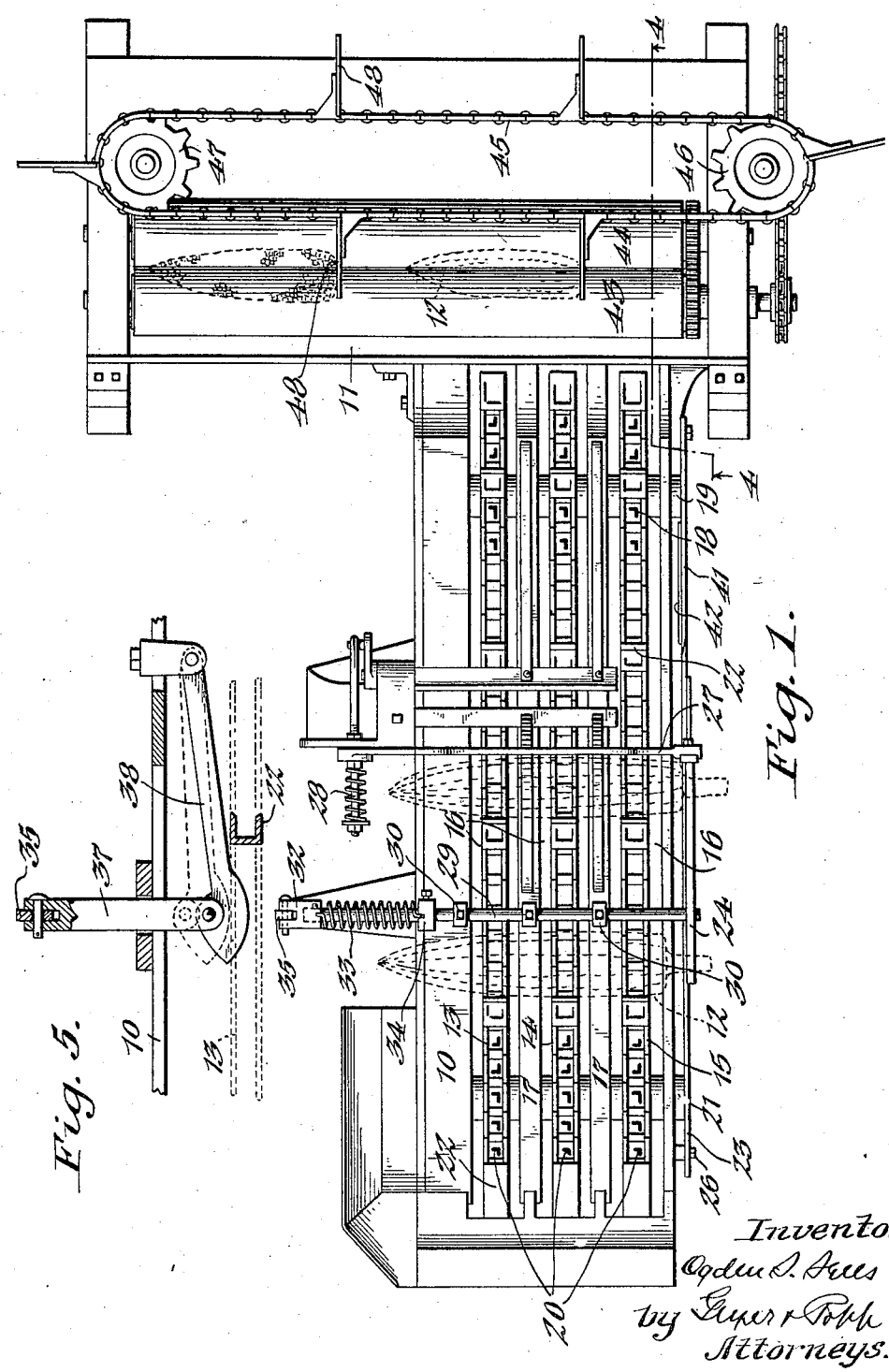

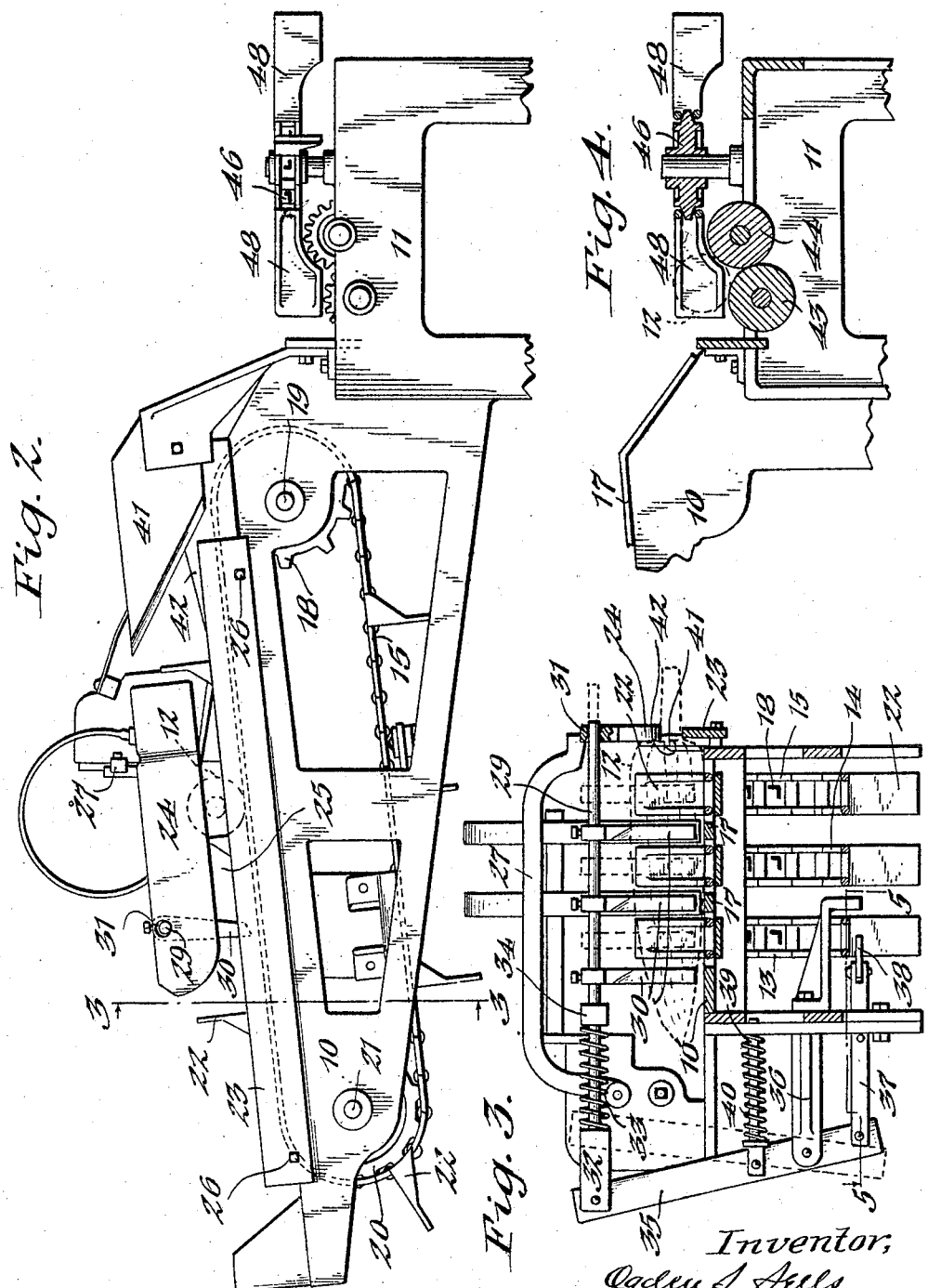

1,523,087

UNITED STATES PATENT OFFICE.

OGDEN S. SELLS, OF BUFFALO, NEW YORK, ASSIGNOR TO PEERLESS HUSKER COMPANY, OF BUFFALO, NEW YORK, A COPARTNERSHIP.

MACHINE FOR HUSKING CORN.

Application filed August 19, 1919. Serial No. 318,544.

*To all whom it may concern:*

Be it known that I, OGDEN S. SELLS, a citizen of the United States, residing at Buffalo, in the county of Erie and State of New York, have invented new and useful Improvements in Machines for Husking Corn, of which the following is a specification.

This invention relates to an improved machine for husking green corn for canning purposes and contemplates subjecting the ears of corn in successive sequence to treating means located along their path of travel through the machine, whereby the husks are progressively removed from each ear as it is continuously advanced through the machine.

In order to enable the kernels to be cut from the cobs of corn, preparatory to cooking or canning these kernels, it is necessary to first thoroughly remove the husks and silks from the ears of corn. This preliminary preparation of the ears of corn before cutting the kernels from the cobs has heretofore been effected by a mechanism which moved the ears into various angular positions with reference to their axes from the time that they were first placed in the machine until the same issued therefrom in a husked condition which involved the use of mechanism unnecessarily large and cumbersome and also required the use of an unduly large number of parts in order to retain control of the position of the ears in their passage through the machine.

It is an object of this invention to provide a machine whereby the operations of removing the husks and associated parts are effected quickly and efficiently and with a minimum number of parts, and so organized that the ears of corn, from the time that they are first placed in the machine until they issue therefrom, are always retained with their axes at the same angle, thereby avoiding the necessity of employing complicated mechanism for controlling the movement of the ears of corn which otherwise would be necessary if the ears during their passage through the machine were shifted so that they assumed different angular positions.

It is also an object of this invention to provide a machine that will receive the individual ears on a continuously moving conveying mechanism whereon the ears are arranged in spaced relation with their axes approximately parallel but in irregular alignment laterally; to move them continuously into the operative zone of aligning means which is operated by special mechanism moving in synchronism with said ears and is adapted to engage and move each ear axially against a gaging means, this axial movement occurring simultaneous with the regular forward movement of the ears imparted thereto by the said conveying mechanism; continuing the movement of said ears after gaging, past and through means for removing the husks from each ear in successive stages, and then discharging the husked ears from the machine.

With such objects in view as well as other advantages which may be inherent in the invention, consisting in the parts and combinations hereinafter set forth and claimed, it is understood that the several necessary elements, parts and combinations constituting the same may be varied in their proportions, placement and general arrangement without departing from the scope and nature of the invention.

In order to make the invention more clearly understood there are shown in the accompanying drawings means and mechanism for placing the same in concrete form, without limiting the improvements in their applications to the particular construction chosen to illustrate the invention.

Before proceeding with a description of the drawings I wish to mention that the views selected to illustrate a machine embodying my invention are such as would most clearly show and disclose the inventive concept, without restricting the showing to exact scale or dimensions. Some of the parts may be more or less exaggerated in their relative proportions to better illustrate their operation, also the structure as shown does not necessarily represent the best or preferred engineering practices in the construction of machines of this type.

In the drawings Fig. 1 represents a top plan of the machine and illustrates the general arrangement and disposition of the various operative elements; the positions of the ears of corn as passing through the machine are indicated by dotted lines; also the manner in which the ears are moved in the various directions for the successive treatments to be described.

Fig. 2 is a side elevation looking from the right hand side of Fig. 1 and illustrates very clearly the general relative arrangement and disposition of the various operative elements and shows very clearly the means for performing the first operation of husk removal and its cooperative relation with the means for performing the second and final operation of husk removal.

Fig. 3 is a sectional elevation on approximately the line 3—3 of Fig. 2 looking in the direction of the arrows and shows the ear aligning mechanism and its operative relation to the conveyor that moves the ears along the bed of the machine.

Fig. 4 is a vertical sectional elevation taken on approximately the line 4—4 of Fig. 1 and very clearly shows the disposition of the final husk removing mechanism and the means for advancing the ears in an axial direction over said mechanism.

Fig. 5 is a sectional plan taken on approximately line 5—5 of Fig. 3 and shows the mechanism for imparting operative movement to the aligning devices illustrated in Fig. 3.

Similar characters of reference indicate corresponding parts throughout the several views.

The main frame of the machine may be of any suitable construction to support the various working parts but preferably comprises a longitudinally arranged section 10 and a transversely arranged section 11. On the front part of the frame are mounted the means whereby the ears of corn 12 are propelled in a direction lengthwise of the machine and operated upon by means which gage the ends of the ears and sever portions of the husks therefrom, and upon the rear part of the main frame are mounted the means which receive the ears of corn from the end gaging and trimming mechanism and move the same in a direction transversely of the machine and past the means which operate to remove the remaining husks from the ears and also discharge the same from the machine ready for cooking or canning, or other operations.

The means whereby the ears of corn are propelled lengthwise of the front part of the machine may be variously constructed but, as shown in the drawings, the same preferably comprise a plurality of conveying belts 13, 14, 15, preferably of the chain type arranged side by side and moving with their upper operative stretches lengthwise forwardly through longitudinal slots 16, which are arranged between longitudinally parallel guide bars 17 mounted on the upper part of the front frame section and serving as a guideway or table for the ears of corn which are to be husked. The front turns of these several longitudinal conveyer belts pass around a set of front sprocket wheels 18 which are mounted on a front horizontal shaft 19 journaled transversely in the front section of the frame while the rear turns of these belts pass around a set of sprocket wheels 20 which are mounted on a horizontal transverse shaft 21 journaled in suitable bearings on the rear part of the frame section. These longitudinal conveyer belts are provided at intervals with corresponding feed wings 22, each set of these fingers being adapted to engage with the ear of corn which is placed upon the front part of the guideway or table on the front frame section and move the same forwardly lengthwise of the machine. While the ears of corn are thus fed forwardly lengthwise of the machine, the same are arranged with their axes at right angles to the direction of movement of the longitudinal conveyer. While the ears of corn are being carried forwardly lengthwise of the machine by this longitudinal conveyer, these ears are moved laterally with reference to the longitudinal conveyor so that the ends of the ears are brought in contact with a gage and thereafter the gaged ends of the ears are severed immediately adjacent to the first row of kernels so as to remove a portion of the husks.

The gage against which the ends of the ears of corn are moved, preparatory to severing or trimming the ears at these ends, may be variously constructed, but in the preferred form shown in the drawings the same comprises lower and upper gage bars 23, 24 which are separated from each other so as to form a longitudinal gage slot 25 therebetween. The lower gage bar is preferably secured to the adjacent part of the main frame by means of bolts 26, as shown in Fig. 2, or by other suitable means, while the upper gage bar is mounted on one end of a supporting arm 27 which latter is pivoted at its opposite end by means of a bolt 28 or otherwise on the main frame.

The lateral movement of the ears of corn relatively to the longitudinal conveyer for engaging the ends of the ears with the gage may be effected in various ways, and the means for this purpose shown in the drawings are therefore to be regarded merely as one appropriate for this purpose. As shown in the drawings, these means for moving the ears against the gage and positioning the same comprises a horizontal shifting rod 29 arranged transversely of the front section of the main frame and above the path of the ears and provided with a plurality of downwardly projecting shifting fingers 30 which normally stand in the path of the forwardly moving ears of corn and are adapted to engage with the same and shift them laterally toward the gage bars. One end of the shifting rod is preferably guided on the upper gage bar by providing the latter with an opening 31 which receives the shifting rod while the opposite end of this shifting rod is mounted in a shifting head 32 so as to be capable of reciprocating horizontally and transversely therewith relatively to the length of the machine but permitting said shifting rod to rock or oscillate in a vertical plane relatively to the shifting head. This shifting rod is yieldingly held in a position for holding its shifting fingers in a pendent position and across the path of the ears of corn by means of a spring 33 surrounding the shifting rod and connected at one end with the shifting head while its opposite end is connected with a collar 34 secured to the shifting rod, as best shown in Fig. 1. The transverse motion of the shifting rod in the direction for shifting the ears of corn against the gage preferably consists of an upright rock lever 35 having its upper arm connected with the shifting head 32, a bracket 36 which projects laterally from the main frame and to which the lever is pivoted between its arms, a shipper rod 37 guided horizontally and transversely in the lower part of the front frame section and connected at its outer end with the lower arm of said rock lever, and a tappet lever 38 pivoted on the lower part of the front frame section so as to be capable of swinging in a horizontal plane and connected at its opposite end with the inner end of the shipper rod. The rock lever 35 is yieldingly turned and held in a position in which the shifting fingers are moved away from the gage and the tappet lever is arranged in the path of the feed wings of the longitudinal chain belt 13 nearest to the rock lever 35, this being preferably accomplished by means of a guide rod 39 pivoted at one end on the upper arm of the rock lever and sliding at its opposite end in a suitable guideway on the main frame, and a spring 40 surrounding this guide rod and bearing at one end against a shoulder on this guide rod while its opposite end bears against the main frame. As each propelling wing and the chain belt 13 moves backward idly on the lower or return stretch of this chain belt, these wings engage with the tappet lever and deflect the same out of the path of these wings from the position shown by full lines in Fig. 5 to the position shown by dotted lines in the same figure, thereby causing the rock lever 35 to be turned in the direction for moving the shifting rod and the shifting fingers thereon transversely of the longitudinal conveyer belts and toward the gage bars. As each wing of the belt 13 clears the tappet lever, the latter is returned to its normal position and the shifting rod and fingers are moved laterally away from the gage bars by the action of the return spring 40. If an ear of corn is arranged in front of a set of propelling wings of the longitudinal conveyer at the time that the shifting fingers are moving transversely relatively to this conveyer, then this ear will be engaged by these fingers and be shifted in a direction transversely to the movement of this conveyer toward the gage until its upper and lower sides of its butt engage with the upper and lower gage bars and a portion of the husks project laterally through the slot between the gage bars, as shown by dotted lines in Fig. 3. The operation of the longitudinal conveyer and the transverse motion of the ear positioning means is so timed that the shifting fingers are out of the path of the conveyer wings as the latter pass the shifting fingers and thereby avoid interference or breakage of any parts. While the ears are thus being shifted on the longitudinal conveyer transversely of the latter and toward the gage, the ears move in a direction at right angles to the movement of the longitudinal conveyer but the axial position of the ears is not disturbed, in other words, while the ears are being moved forwardly by the longitudinal conveyer with the axes of the ears arranged at right angles to the direction of movement of the longitudinal conveyer, the positioning means at the same time move the ears in a direction parallel with the axes of the ears until they contact with the gage. As the ears continue their forward motion by the action of the longitudinal conveyer wings, the shifting fingers are gradually lifted until the ears of corn have cleared the same and then these fingers are again returned to their normal pendent position by means of the spring 33 which rocks the shifting rod backwardly preparatory to operating upon the next ear of corn which may be fed to the machine.

After the ears of corn have been properly positioned against the gage, the same, during their continued forward motion under the action of the longitudinal conveyer and while still arranged with their axes at right angles to the direction of movement of the longitudinal conveyer, are operated upon by a device which removes a portion of the husks adjacent the gaged ends to thus render the subsequent removal of the remaining husks and silks more easy and thorough. Various forms of devices may be employed for accomplishing this purpose, that, for example shown in the drawings, consisting of upper and lower blades 41, 42, which are arranged on a line slightly inside of the plane of the gage bars and having their edges converging so that the ears of corn after being gaged will be carried past the blades of the device and have portions of the husks removed in the manner described.

After the ears of corn have been thus treated, the same are received by the means which remove the remaining husks from the body of the ears which means are mounted on the main frame and preferably comprise a pair of husking rollers 43, 44, which are arranged parallel and in contact with each other and are journaled in the main frame so that they are horizontal and transverse to the direction of movement of the longitudinal conveyer. These husking rollers are turned so that the opposing sides move downwardly, whereby these rollers grip the loosened husks of the ears of corn which are deposited in the bight between these rollers and cause these husks to be discharged downwardly therefrom. The ears of corn are delivered from the rear part of the longitudinal conveyer upon one end of the bight between the husking rollers without changing the axial position of the ears so that when the latter are deposited upon the receiving portion of the husking rollers these ears are arranged with their axes lengthwise and parallel with the axes of the husking rollers which position of the ears is still the same as that relatively to the longitudinal conveyer. While the ears are thus resting upon the husking rollers, the same are moved lengthwise from the receiving toward the delivery end of these rollers during which movement of the ears the husks are completely removed from the same and then the ears are discharged from the delivery end of these rollers. As shown in Fig. 4, one of the husking rollers is slightly lower than the other, which causes the ears to exert a slightly greater pressure against the lower roller as compared with the upper roller, and so that the ears are turned by the lower roller 43 and thus present the entire circumference of each ear to the nip of the rollers for removing all parts of its husks.

The movement of the ears of corn lengthwise of the husking rollers may be effected by means which may vary widely in construction, but as the means which are shown in the drawings have proven satisfactory in practice, the same are preferred. As there shown, these means comprise a chain belt 45 having its operative stretch arranged lengthwise over the elevated husking roller 44 and passing with its opposite turns around sprocket wheels 46, 47, which are journaled in suitable bearings on the upper part of the rear frame section and feeding or propelling wings 48 projecting laterally from the rear chain belt and movable with the operative stretch of this belt lengthwise and horizontally over the husking rollers, so as to convey any ears which may be arranged thereon from the receiving to the delivery end of these rollers. As the ears of corn are moved lengthwise of the husking rollers, the same still remain with their axes horizontal and parallel with the position which they occupied when first placed on the husking roller.

Inasmuch as any suitable means may be employed for driving the front longitudinal conveyer, the husking rollers and the rear transverse conveyer, no particular means for this purpose are shown in the drawings.

It will be noted that in the operation of this machine, each of the ears of corn during its passage through the machine is first moved forwardly by the longitudinal front conveyer, while the ear of corn is arranged with its axis at right angles to the direction of movement of this conveyer, then the ear is moved transversely to the direction in which it has been moved by the longitudinal conveyer; in other words, parallel with the axis of the ear until the same is in contact with the gage. Then the ear continues its forward movement with its axis still arranged at right angles to the direction of movement of the longitudinal conveyer, during which a portion of the husk is removed. Then the ear while still arranged with its axis at right angles to the direction of movement of the longitudinal conveyer is deposited upon the receiving end of the husking rollers, and then the ear is moved by the transverse conveyer lengthwise of the husking rollers and discharged therefrom, the ear at this time moving in a direction parallel with its axis and at right angles to the direction of movement of the longitudinal conveyer. Inasmuch, therefore, as each ear of corn from the time it is placed in the machine by the operator to the time it is discharged from the machine, is not disturbed so far as the angle of its axis is concerned, this eliminates all liability of bringing the ear into an abnormal position which would require correction and involve the use of considerable mechanism for properly controlling the ear of corn during its passage through the machine, which otherwise would be necessary if the ear were permitted to assume various angular positions with reference to its axis while passing through the machine and being operated upon by gaging, cutting and husk removing devices. It is therefore possible in the present machine to not only simplify its construction and reduce its cost of manufacture, but also render its operation much more certain and effect a much larger output than is possible in machines in which the axial angle of the ears of corn is constantly changing.

I claim as my invention:

1. A machine for removing the husk from ears of corn by successive stages, the combination of means for moving ears of corn continuously forward in spaced relation and processional arrangement with their axes approximately parallel, means positively operated and moved parallel with the axes of said advancing ears and synchronized therewith for successively engaging each ear and positively moving it axially against an aligning member, continuing the forward movement of said ears after alignment and delivering each ear in succession to other conveying means for moving said ears at approximately right angles to their former path of travel and in reformed processional arrangement with their axes in longitudinal alignment with means along said paths of travel for removing the husks from said ears.

2. A machine for removing the husks from ears of corn through successive stages, the combination of means for moving ears of corn continuously forward in spaced relation and processional arrangement with their axes approximately parallel, reciprocating means positively operated and moved in parallel lines with the axes of said ears of corn and synchronized therewith for successively engaging each ear and positively moving it axially into engagement with aligning means, continuing the forward movement of said ears after alignment and delivering each ear in succession to other conveying means for moving said ears at approximately right angles to their former path of travel and in reformed processional arrangement with their axes in longitudinal alignment with means placed along said paths of travel for removing the husks from said ears.

3. In a machine for removing the husks from ears of corn through successive stages, the combination of means for moving ears of corn continuously forward in spaced relation and processional arrangement with their axes approximately parallel, ear aligning means positioned over the path of travel of said ears and having reciprocating movement in parallel lines with the axes of said ears and synchronized therewith for successively engaging each ear and positively moving it axially into engagement with fixed aligning means, continuing the forward movement of said ears after alignment and delivering each ear in succession to other conveying means for moving said ears at approximately right angles to their former path of travel and in reformed processional arrangement with their axes in longitudinal alignment, with means arranged along the said paths of travel for removing the husks from said ears.

4. In a machine for removing the husks from ears of corn through successive stages, the combination of means for moving ears of corn continuously forward in spaced relation and processional arrangement with their axes approximately parallel, ear aligning means positioned over the path of travel of said ears and having reciprocating movement in parallel lines with the axes of said ears and synchronized therewith for successively engaging each ear and positively moving it axially into engagement with fixed aligning means, said reciprocating aligning means receiving its motion from the means for moving the ears of corn forward through the machine, continuing the forward movement of said ears after alignment and delivering each ear in succession to other conveying means for moving said ears at approximately right angles to their former path of travel and in reformed processional arrangement with their axes in longitudinal alignment, with means arranged along the said paths of travel for removing the husks from said ears.

5. In a machine for removing the husks from ears of corn through successive stages, the combination of conveying means for receiving and moving ears of corn continuously forward in spaced relation and processional arrangement with their axes approximately parallel, ear aligning means positioned over the path of travel of said ears and having reciprocating movement in parallel lines with the axes of said ears and synchronized therewith for sucessively engaging and positively moving each ear into engagement with fixed aligning means, said reciprocating aligning means receiving its motion from the conveyor means that receives and moves the ears of corn through the machine, yielding devices associated with said reciprocating means for protecting said ears of corn from mutilating damage, continuing the forward movement of said ears after being positioned by said aligning means and delivering each ear in succession to associated conveying means for moving said ears at approximately right angles to their former path of travel and in reformed processional arrangement with their axes in approximately longitudinal alignment, with fixed and movable means arranged along the said paths of travel for removing the husks from said ears.

6. In a machine for removing the husks from ears of corn in two successive operations, the combination of continuously moving conveying means for receiving and moving ears of corn forward in spaced relation and processional arrangement with their axes in approximately parallel lines, ear aligning means located over the path of travel of said ears and having reciprocating movement in approximately parallel lines with the axes of said ears and synchronized therewith for successively contacting with and positively moving each ear into sliding engagement with fixed aligning means, said reciprocating aligning means receiving its motion from the said conveying means for moving the corn forward through the machine, yielding devices associated with said reciprocating aligning means for protecting said ears of corn from damage from contact with said aligning means, stationary positioned yielding means for engaging and holding said ears in position after they have been positioned by said reciprocating aligning means, continuing the forward movement of said ears after being positioned by said aligning means and delivering each ear in succession to associated conveying means for moving said ears at approximately right angles to their former path of travel and in reformed processional arrangement with their axes in approximate longitudinal alignment, with fixed and movable means arranged along the said paths of travel for removing the husks from said ears.

7. In a machine for removing coverings and attached portions from articles of vegetative origin, comprising a continuously moving conveyor adapted to receive and move in spaced relation a succession of covered articles promiscuously arranged as to lateral alignment, a series of reciprocating fingers moving approximately axially with said articles for engaging one article at a time and each in succession, by frictional contact therewith and moving each article the necessary distance to align it in sliding contact with gaging means, yielding means associated with said reciprocating fingers for protecting said articles from mutilating damage, other yielding means for engaging said articles after alignment and holding them against displacement, continuing the foward movement of said aligned and positioned articles and delivering them to associated continuously moving means whereby their movement is continued until they are discharged from the machine, with associated means arranged along the paths of travel of said articles for engaging said coverings and attached portions and removing them in successive operations.

8. In a machine for removing coverings and attached portions from articles of vegetative origin, comprising a flexible, continuously moving conveyor adapted to receive and move in spaced relation a succession of covered articles promiscuously arranged as to lateral alignment, a series of reciprocating fingers mounted upon a horizontally disposed spindle capable of movement in three directions and being yieldingly controlled in one direction and adapted to engage one article at a time and each in succession by frictional contact therewith and move the same the necessary distance to align it with adjustable gaging means, yielding means disposed over the path of the moving articles and contacting with said articles to hold them against displacement, continuing the forward movement of said articles and delivering them to associated flexible, continuously moving conveying means whereby their movement is continued in a different direction until they are discharged from the machine, with two operating stations arranged along the paths of travel of said articles where said coverings and attached portions are removed therefrom.

OGDEN S. SELLS.